United States Patent [19]

Cosenza

[11] Patent Number: 5,082,406
[45] Date of Patent: Jan. 21, 1992

[54] SELF LOCKING PANEL FASTENER WITH DEVICE FOR VISUALLY INDICATING WHETHER FASTENER IS LOCKED

[75] Inventor: Frank J. Cosenza, Santa Barbara, Calif.

[73] Assignee: VSI Corporation, Chantilly, Va.

[21] Appl. No.: 545,808

[22] Filed: Jun. 29, 1990

[51] Int. Cl.⁵ ............................................ F16B 39/00
[52] U.S. Cl. .................................. 411/105; 411/14; 411/353; 403/408.1
[58] Field of Search ............... 411/6, 7, 14, 105, 112, 411/113, 352, 353; 403/406.1, 407.1, 408.1

[56] References Cited
U.S. PATENT DOCUMENTS

| | | | |
|---|---|---|---|
| 4,191,236 | 3/1980 | Duran | 411/105 |
| 4,828,442 | 5/1989 | Duran | 411/353 |
| 4,884,930 | 12/1989 | Dobbeler | 411/105 |

Primary Examiner—Neill R. Wilson
Attorney, Agent, or Firm—Irving Keschner

[57] ABSTRACT

A self locking panel fastener comprising a receptacle connected to one of the two panels being secured together, the receptacle having an internally threaded nut portion, an externally threaded stud having a head portion extendible through the apertures of the panels, a shaped end portion and a bore formed therein; a first locking member within said receptacle having a shaped aperture and sized to receive the shaped end portion of the stud to drivingly connect the first locking member and the stud; a second locking member mounted within the receptacle for generally axial movement relative to the nut portion; a spring member for forcing the second locking member into engagement with the first locking member to form a locking connection between the stud and the second locking member; and a member for driving the second locking member generally axially relative to the first locking member against the force of the spring to break the locking connection and to allow counterrotation of the stud relative to the nut portion to allow unscrewing of the stud from the nut portion, the driving member having a first position within the bore when the stud is engaged with the receptacle and a second position when the stud is disengaged from the receptacle.

12 Claims, 3 Drawing Sheets

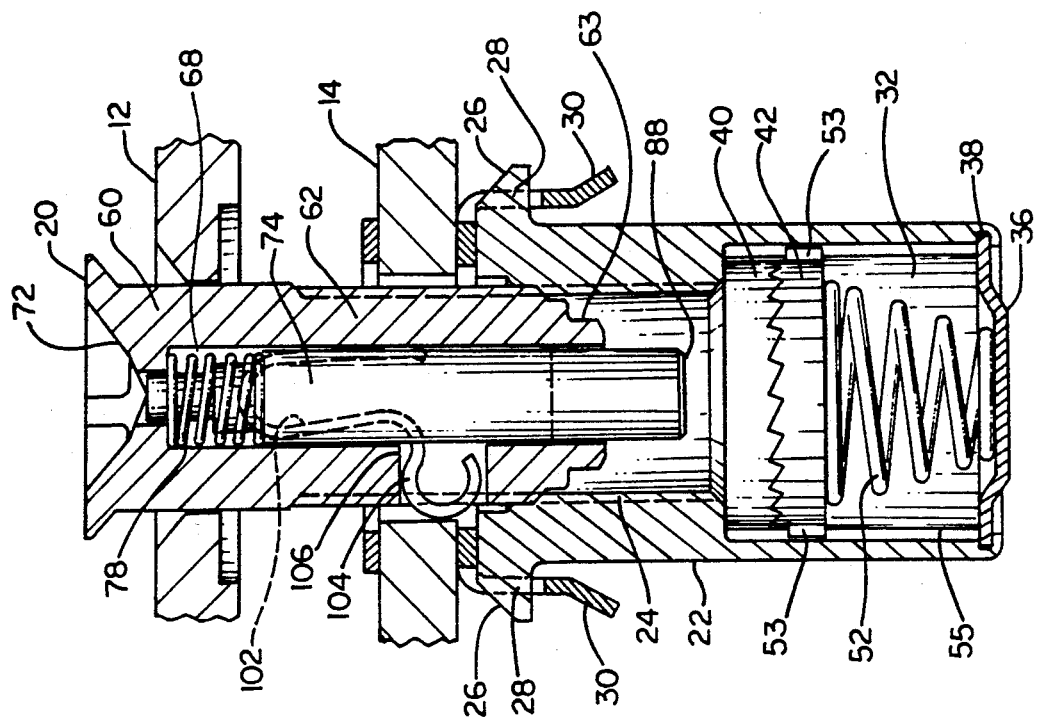
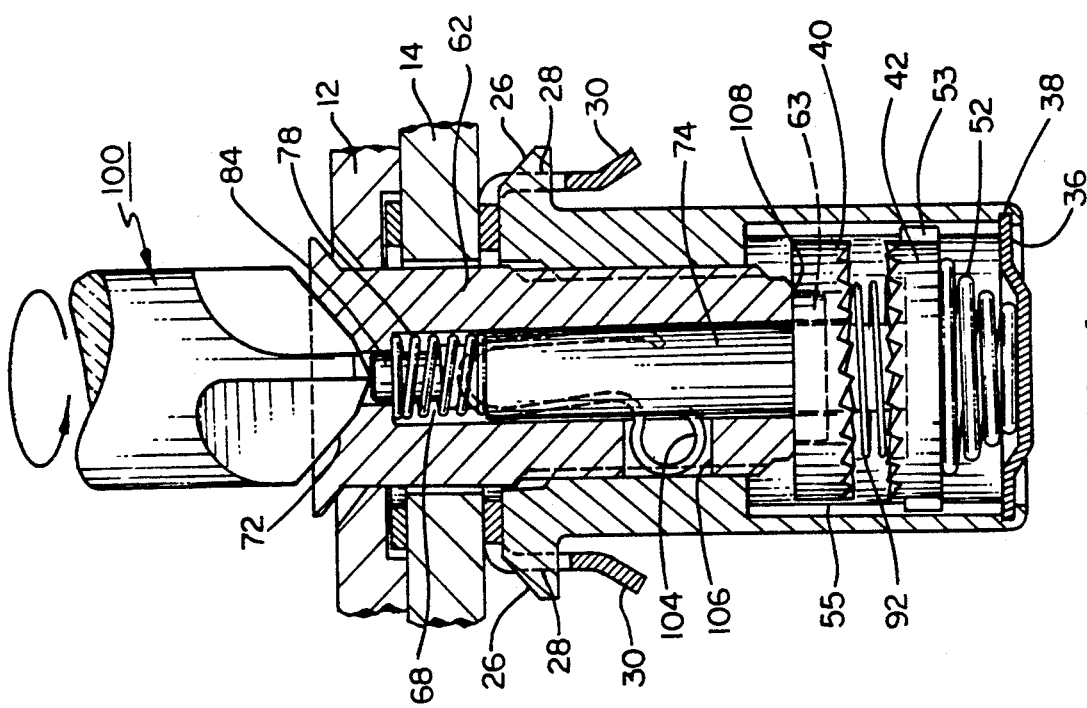

SELF LOCKING PANEL FASTENER WITH DEVICE FOR VISUALLY INDICATING WHETHER FASTENER IS LOCKED

BACKGROUND OF THE INVENTION

1. Field of the Invention

The present invention relates to a self-locking fastener and, more particularly, to a panel fastener which includes positive locking, a holdout device for holding the fastener in a retracted position when the fastener is disengaged and a device for visually indicating to an observer whether the fastener is locked.

2. Description of the Prior Art

Various machines such as aircraft, missiles, etc., which produce, or are subject to, vibration use removable panels sometimes called access panels. These panels are secured by fasteners to various members of the aircraft structure such as the frame and are removable to provide access to electronic, hydraulic, or other types of equipment. As these panels must be removed from time to time, the fasteners therefore must be fast acting. Typically threaded fasteners which include a stud and a nut are used.

A primary problem with threaded fasteners is that the vibration of the panels tends to loosen the stud from the nut. This problem is particularly acute in aircraft as the frequency of the vibration may vary over a wide range.

There have been numerous attempts to overcome this problem. One such attempt involves deforming the nut to a generally elliptical internal cross-sectional shape so that the nut will tightly grip the external threads of the stud to thereby frictionally retard relative rotation between the stud and nut. Because of the substantial amount of friction between the stud and nut, it is very difficult to screw and unscrew the stud from the nut. The high friction between the stud and nut causes substantial wear on the fastener and, upon repeated usage, the gripping capability of the nut is reduced thereby correspondingly increasing the danger that the fastener will become unfastened. Finally, this arrangement does not provide a positive lock, but merely provides a retarding or braking action against rotation of the stud relative to the nut.

The fastener disclosed in U.S. Pat. No. 3,404,716 to Cosenza discloses a positive self-locking feature which locks the stud against counterrotation relative to the nut. The positive lock can be completely disengaged to allow relative counterrotation between the stud and nut. With the lock disengaged, there is no wear thereon as the stud and nut are rotated relative to each other, nor can the lock retard such relative rotation. The Cosenza fastener carries a movable actuator member in the stud. The actuator member is exposed so that it can be moved relative to the stud. The positive lock is responsive to movement of the actuator member to become disengaged from either the stud or the nut to allow relative rotation in both directions between the stud and nut.

An outer end of the actuator member at the head portion of the stud is exposed so that the actuator member is engageable and depressible by the tool which is utilized to rotate the stud. The locking means, are made releasable or disengageable from the stud in response to the depressing of the actuator member. In this manner, the lock is automatically disengaged when the tool for rotating the stud is drivingly engaged with the stud. The locking means is embodied in a pair of locking members the first of which is rotatable with the stud and the second of which is movable axially and held against rotation. When the locking members are held in locking engagement, a positive locking connection is formed between the stud and the second locking member. The actuating member is movable to disconnect or break this locking connection at the will of the operator to allow free rotational movement of the stud relative to the nut without interference from the locking members.

To facilitate indexing of the locking members, each of the locking members preferably includes a ratchet. To provide a positive lock each of the ratchets has a plurality of teeth, the profile of which defines at least one generally axially extending face. The axially extending faces of the two ratchets are engageable so that no rotational forces applied to the second ratchet by the first ratchet through the axial faces will be operative to cam the second ratchet axially. In this manner, the stud is positively locked against counterrotation relative to the nut when the two ratchets are held in driving engagement with each other.

U.S. Pat. No. 4,191,236 to Duran discloses a panel fastener assembly comprising a stud assembly and receptacle assembly for receiving the stud component of the stud assembly. The stud and receptacle of the receptacle assembly include mating locking teeth and a movable pin permitting the teeth to be locked together or disengaged.

Although the fasteners disclosed in the Cosenza and Duran patents improved over the pre-existing fasteners, neither provided a stud holdout capability or a visual indication to an operator that the fastener is properly engaged with the mating receptacle. A panel fastener holdout feature is desirable in that the fastener is held in a retracted position when the fastener is disengaged from its nut member on an aircraft, preventing the fastener from becoming damaged when the panel is removed and moved on a flat hard surface or interfering with the positioning of the panel preparatory to fastening the panel in place. The lack of a visual indication that the fastener is engaged in its positive locking mechanism can lead to safety problems since an operator could be distracted during the fastener insertion, remove the wrenching tool, and thereafter be unable to determine which of the fasteners have been locked in place. This is a particularly serious problem when a large number of fasteners are being installed in a panel. In addition, the actuator member used in the aforementioned Cosenza and Duran patents is always in the same position and thus cannot indicate whether the stud was completely engaged, partially disengaged or totally removed from its mating receptacle. In particular, the position of the actuator member was flush or near flush to the head of the stud, providing no indication to the operator whether the stud was properly engaged.

What is thus desired is to provide a self-locking panel fastener which incorporates a holdout feature and also provides a visual indication to an operator as to whether the fastener is engaged properly with the mating receptacle.

SUMMARY OF THE PRESENT INVENTION

The present invention provides a self-locking panel fastener which has positive locking, a stud holdout mechanism and an indicator pin to visually indicate to an operator whether the fastener is engaged properly with a mating receptacle.

The fastener comprises a receptacle connected to one of the two panels being secured together, the receptacle having an internally threaded nut portion, an externally threaded stud having a head portion extendible through the apertures of the panels, the stud being rotatable relative to receptacle nut portion to turn the threaded portion into said nut portion to secure the stud to said nut portion, the stud having a shaped end portion and a bore formed therein; a first locking member within said receptacle having a shaped aperture and sized to receive the shaped end portion of the stud to drivingly connect the first locking member and the stud; a second locking member mounted within the receptacle for generally axial movement relative to the nut portion; a spring member for forcing the second locking member into engagement with the first locking member to form a locking connection between the stud and the second locking member to allow the second locking member to positively lock the stud against said counterrotation; and means for driving the second locking member generally axially relative to the first locking member against the force of the spring to break the locking connection and to allow counterrotation of the stud relative to the nut portion to allow unscrewing of the stud from the nut portion, the driving means having a first position within the bore when the stud is engaged with the receptacle and a second position when the stud is disengaged from the receptacle.

The present invention thus provides a fastener which incorporates a number of desired features in a single device in a cost-effective manner. The fastener, in particular, incorporates positive locking and a holdout mechanism which serves both to hold the stud in position when it is disengaged from the subpanel and to support an indicator pin positioned within the stud. The indicator pin provides a visual indication to an operator as to whether the fastener is in the locked or unlocked position, thus simplifying the procedure for verifying that proper installation has been accomplished without requiring extensive operator training.

DESCRIPTION OF THE DRAWING

For a better understanding of the invention as well as other objects and further features thereof, reference is made to the following description which is to be read in conjunction with the accompanying drawing wherein:

FIG. 4 is a longitudinal sectional view through a fastener constructed in accordance with the teachings of the present invention with the fastener stud in the process of being disengaged;

FIG. 5 is a longitudinal sectional view through a fastener constructed in accordance with the teachings of the present invention with the locking means thereof being in the unlocked position with the fastener being shown in the partially disengaged position;

Figure 7:
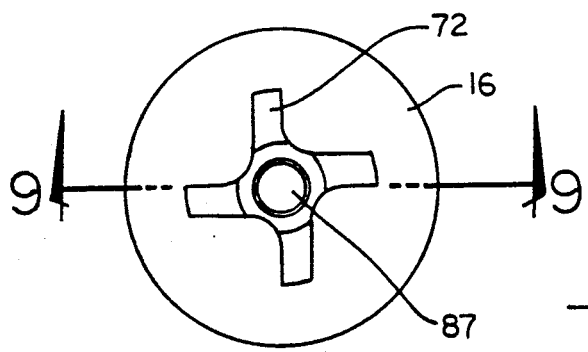
FIG. 7 is a top plan view of the fastener stud shown in FIG. 6.
Figure 10:
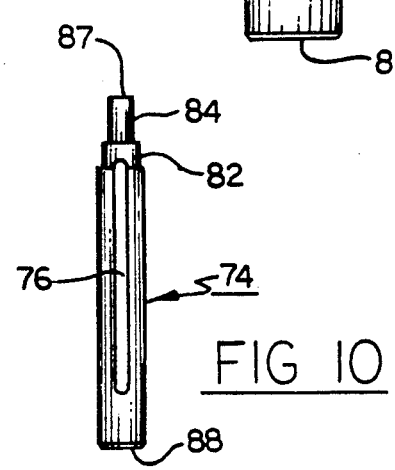
Figure 11:

FIG. cross-sectional view along line 9—9 of FIG. 7;

FIG. 10 is a side elevational view of the indicator pin utilized in the present invention; and FIG. 11 is a bottom plan view of the indicator pin shown in FIG. 10.

DETAILED DESCRIPTION OF THE INVENTION

Figure 1:
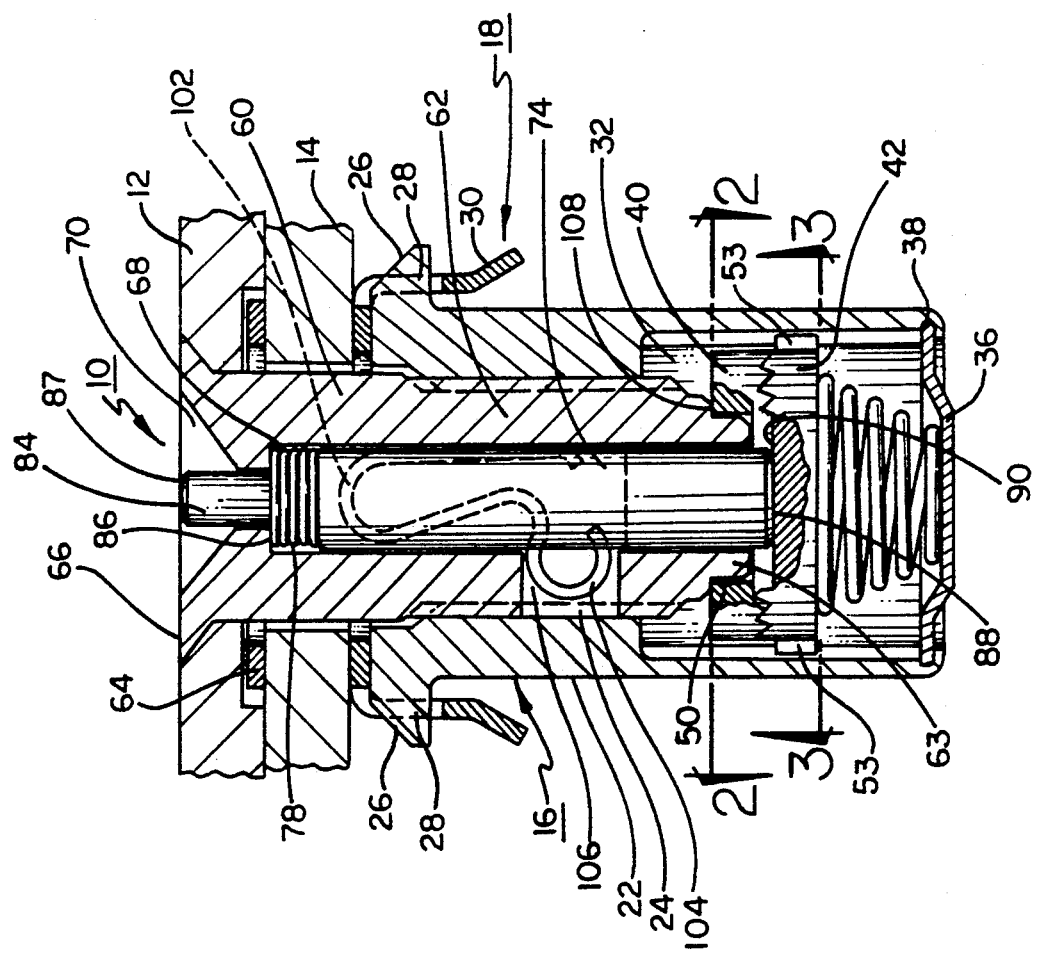
FIG. 1 is a longitudinal sectional view through a fastener constructed in accordance with the teachings of the present invention with the locking means thereof being in the locked position.

Referring to the drawings to FIG. 1 thereof, reference numeral 10 designates a fastener constructed in accordance with the teachings of this invention. The fastener 10 is shown in a typical environment in which it is utilized to connect an upper or outer panel 12 to an inner or lower panel 14. The upper panel 12 is removable from the panel 14. It is apparent, of course, that the adjectives upper and lower are used only with reference to the various figures of the drawing and the fastener 10 can assume any desired orientation.

Generally, the fastener 10 includes a receptacle assembly 16 suitably secured as by a cage 18 to the lower panel 14. The fastener 10 also includes a stud 20 which extends through aligned apertures in the panels 12 and 14, and is threadedly affixed to the receptacle assembly 16 to hold the panels together.

Receptacle assembly 16 includes a receptacle 22 having an internally threaded axial nut portion 24 adjacent the upper end thereof. A pair of tabs 26 integral with the receptacle 22 project radially from the upper end thereof and are received in apertures 28 of the cage 18. The apertures 28 are formed in downwardly extending flanges 30 of the cage 18. Cage 18 is secured to the lower side of the lower panel 14 by suitable fasteners (not shown).

The receptacle 22 defines an axial cylindrical cavity 32 below the nut portion 24. The lower end of the cavity 32 is partially closed by plate 36 which is retained in a peripheral groove 38.

A pair of locking members in the form of an upper ratchet 40 and lower ratchet 42 are provided within the cavity 32. The ratchets 40 and 42 mate identically with each other.

FIGS. 1, 4 and 5 show that each ratchet has a plurality of teeth. Since the present invention is not directed to the teeth configuration, specific details thereof will not be set forth herein. However, the teeth configuration shown in U.S. Pat. No. 3,404,716 may be used and the teachings of that patent necessary for an understanding of the present invention are incorporated herein by reference.

In any event, when the ratchets 40 and 42 are engaged as shown in FIG. 1, the axially extending faces will be in engagement to prevent relative counterrotation between the two ratchets.

Figure 2:
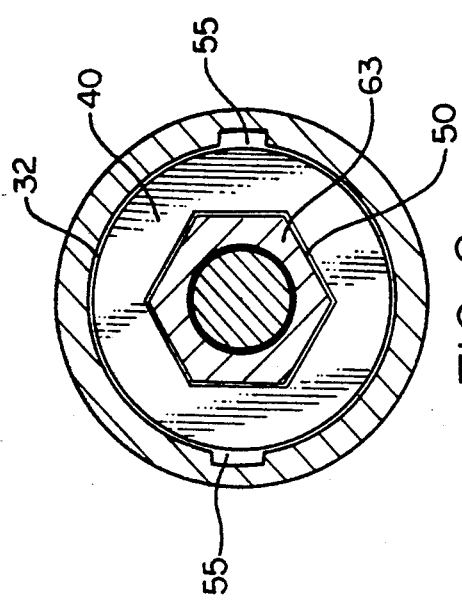
FIG. 2 is a cross-sectional view along line 2—2 of FIG. 1.
Figure 3:
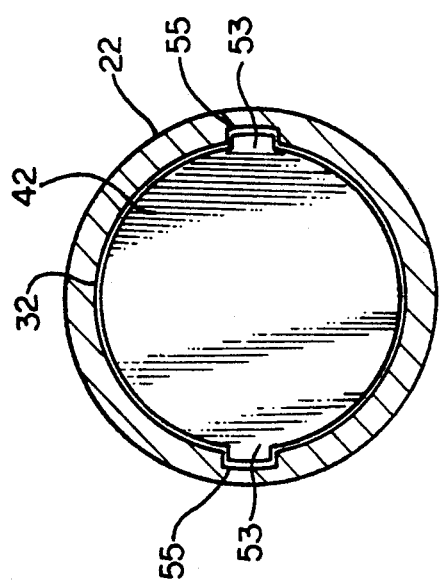
FIG. 3 is a cross-sectional view along line 3—3 of FIG. 1.

The ratchet 40 has an axially extending aperture 50 extending therethrough as shown in FIG. 1, the aperture 50 having a hexagonal shape (other shapes can be used) as shown in FIG. 2. The teeth of the ratchets 40 and 42 are engageable and both of the ratchets have outside diameters which are slightly smaller than the diameter of the cavity 32. The upper ratchet 40 is free to move within the cavity 32 except as controlled by the spring biased lower ratchet 42 and the stud 20. In particular, lower ratchet 42 is biased by coil spring 52 positioned between the bottom surface of ratchet 42 and the upper surface of plate 36. A pair of lugs 53 formed on ratchet 42 are positioned in splines 55 formed in axial cavity 32, allowing ratchet plate 42 to move axially within the cavity, rotational movement being inhibited.

Figure 8:
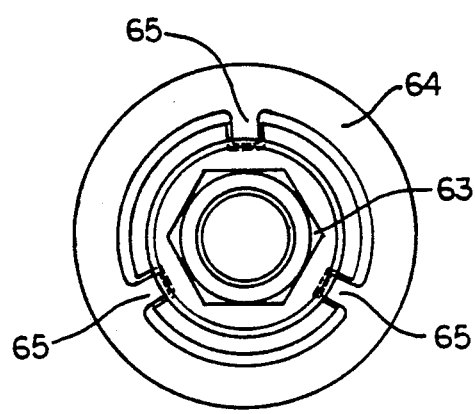
FIG. 8 is a bottom plan view of the fastener stud shown in FIG. 6.

The stud 20 has a head and shank portion 60 and an externally threaded portion 62 which is receivable within the nut portion 24 to threadedly interconnect the stud and the receptacle assembly 16. The front end of stud 20 has a hexagonal (or other shape) nut 63 formed thereon, which is adapted to fit into ratchet plate aperture 50. Stud 20 may be secured to the upper panel 12 to prevent loss thereof when the stud 20 and the upper panel are removed from the lower panel 14. Although various means may be employed to accomplish this function, in the embodiment illustrated the stud 20 is formed with three axially extending grooves (not shown) and a retaining ring 64 having three projections 65 mounted on the stud 20 with the projections being movable axially in the grooves as shown in FIG. 8. The grooves terminate in an end surface which prevents the retaining ring 64 from falling off the stud 20. The upper end of the head portion 60 of the stud 20 is formed with an annular peripheral enlargement 66. Accordingly, even with the stud 20 and the panel 12 removed from the panel 14, the stud 20 is secured to the panel 12 by the peripheral enlargement and by the retaining ring 64.

The stud 20 has an axial passageway, or bore, 68 extending therethrough. The upper end 70 of bore 68 terminates near an enlarged driving recess 72. A cylindrical pin actuator member 74 is mounted in the passageway 68 for axial movement therein The actuator member 74 is in the form of a cylindrical shaft which includes longitudinal slot 76 as shown in FIG. 10. A coil spring 78 is positioned around extensions 82 and 84 of pin 74 as shown, the upper annular shoulder 86 of bore 68 biasing pin 74 in the position shown in FIG. 1 when the fastener is locked. The top surface 87 of extension 84 is normally exposed with the driver recess and terminates in the locked position of the fastener, at the upper surface of stud head portion 60 as shown in FIG. 1.

When the two ratchets 40 and 42 are utilized, it is desirable to cause the upper ratchet 40 to be rotatable with the stud 20; however, it is preferred not to make the ratchet 40 an integral part of the stud 20. Accordingly, as noted above, the stud 20 is provided with a hexagonal shaped nut configuration which corresponds generally to the hexagonal shaped configuration of the aperture 50 in the upper ratchet 40. As noted previously, the nut and aperture 50 can have other shapes.

With the elements of the fastener 10 exposed as shown in FIG. 1, the stud 20 is locked against rotational movement which would tend to unscrew the stud from the nut portion 24. More particularly, the hex configuration 63 is received within aperture 50 of ratchet 40. Thus, the stud 20 cannot rotate relative to the upper ratchet 40 when engaged with lower ratchet 42. The teeth of the ratchets 40 and 42 are engaged in a positive locking arrangement that prevents unloosening. This relationship is maintained by the coil spring 52. Thus, no relative counterrotational movement between the stud 20 and the nut portion 24 which would tend to unscrew the stud is possible. That is, the axial or near axial faces of one side of the ratchet teeth prevent any counterrotational forces applied to stud 20.

As noted above, ratchet 42 is held against rotation by lugs 53 which are engaged in splines 55 formed in cylindrical cavity 32. Thus, the stud 20 is positively locked within the nut portion 24.

Assuming now that the user desires to unscrew the stud 20 from the nut portion 24, a tool 100 (FIG. 4) is inserted into the driving recess 72 and into engagement with the slots thereof. The lower end of the tool 100 engages the upper end of the actuator member 74 to axially depress the latter to the position shown in FIG. 4. This causes the lower end 88 of the actuator member 74 to engage an elevated portion 90 of ratchet 42 and urge it axially downwardly away from the nut portion 24 against the biasing force of the spring 52 to the position shown in FIG. 4. With the fastener 10 in the position shown in FIG. 4, upper ratchet 40 will not fall off hex 63 configuration of stud 20, spreader spring 92 maintaining the ratchet plates apart to free the stud for rotation or counterrotation relative to the nut portion 24.

When the ratchets 40 and 42 are engaged, the inclined faces of the teeth permit rotational movement of the stud 20 only in the locking, or clockwise, direction. However, as the tool 100 is operative to automatically release the locking means for the stud, as it is inserted downwardly into the driving recess 72, the positive anti-rotation lock formed by the ratchets 40 and 42 will be inoperative automatically during fastening and unfastening of the fastener 10 with the tool 100. Although the actuator member 74 for unlocking or disconnecting the locking means could be located in various positions, it is preferred to locate it in stud 20 to allow for easy access thereto and to provide for automatic operation thereof in response to the use of a tool for rotating the stud 20.

Figure 6:
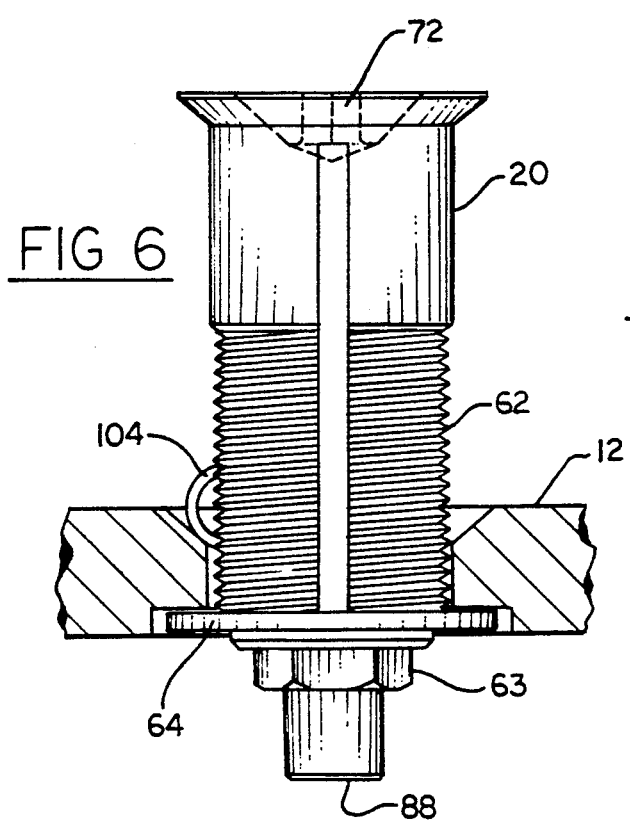
FIG. 6 is a side elevational view of the fastener stud shown in the holdout position.
Figure 9:
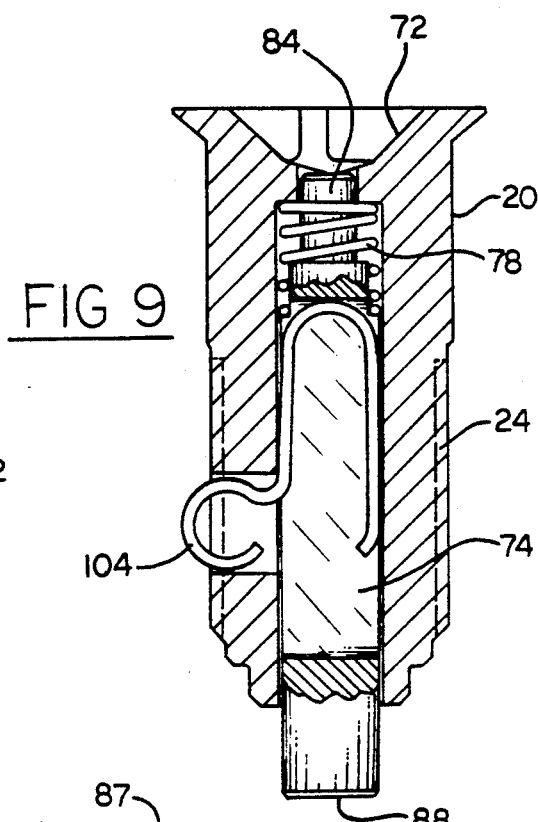

In accordance with the teachings of the present invention, a holdout spring 102 is nested in the slot 76 of actuator member, or indicator pin, 74, indicator pin 74 in turn being positioned in the center stud driving recess, or aperture, 68. Spring 102, generally a U-shaped wire spring member, serves two functions, the first being to captivate (or hold) indicator pin 74 within the bore 68 as shown in the figures. This is accomplished by positioning the hookend 104 of spring 102 within longitudinal slot 106 formed within stud 20. Spring 102 also functions as a stud holdout mechanism whereby the stud 20 is maintained spaced from the upper surface of panel 12 when the stud 20 is disengaged from the receptacle 22 and lower panel 14 as shown in FIG. 6. In this situation, the bearing surface 104 of spring 102 contacts the sidewall or the countersink of the opening in panel 12 holding the fastener against downward movement as illustrated. The use of a wirespring holdout for retaining a fastener in a retracted position on a panel is disclosed in U.S. Pat. No. 4,119,131, the teachings of which are necessary for an understanding of the present invention being incorporated herein by reference. Indicator pin 74 is automatically forced to the bottom of driving recess 72 by spring 78 when stud 20 is in the free, or nonengaged, state as shown in FIGS. 5 and 9. When the stud 20 is mated with the receptacle, the driver, or wrenching tool, 100 forces pin 74 to stay in the down position until the stud 20 is securely tightened in place. When tool 100 is removed, pin 74 is forced up almost level with the upper surface of panel 12 because of the pressure exerted by spring 52 (which overcomes the opposite lower pressure of spring 78) on the bottom surface of ratchet plate 42. Thus, at this point, there is a visual indication, easily observable by an operator, that the fastener is locked because ratchet plate 42 has returned to its proper position in contact with upper ratchet plate 40 (the vertical position of ratchet plate 40 is limited by annular shoulder 108 formed on stud 20). To release the stud 20 once again, tool 100 is placed in the driving recess 72 and pin 74 is depressed to the bottom of the recess, the lower end of the pin disengaging the one-way locking ratchet plate 42 from the upper locking ratchet plate 40 and disengagement commences. After a number of counterclockwise (removal) rotations, should the operator be distracted and remove tool 100, that operator (or another operator) can immediately discern whether the stud is still engaged in its positive locking mechanism or is disengaged simply by observing the position of indicator pin 74. In particular, even if the fastener is partially disengaged, the operator will be able to determine that fastener assembly 10 is locked and in its vibration resistant mode since the top of pin 87 is flush with head 66 of stud 20. If the top 87 of indicator pin 74 is below the surface of head 66, the operator understands that stud 20 has disengaged itself from upper ratchet 40 and is loosened.

The present invention thus provides a fastener which provides a number of desired features in a single device. In particular, the fastener of the present invention has positive locking and a unique stud holdout mechanism for use when the fastener is disengaged from the subpanel. In addition, a visual indicator pin is provided to enable an operator to easily discern whether the fastener is in the locked or unlocked position. The stud holdout mechanism also functions to support the indicator pin within the stud, reducing the number of fastener assembly components required.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. In a fastener for securing together a pair of panels wherein each of the panels has an aperture therethrough, the combination of:
   a receptacle connected to one of the panels and having an internally threaded nut portion;
   a stud extendible through the apertures of the panels and having an externally threaded portion and a head portion, said stud being rotatable relative to said nut portion to turn the threaded portion into said nut portion to secure said stud to said nut portion, said stud becoming disconnected from said nut in response to relative counterrotation between said stud and said nut, said stud having a shaped end portion and a bore formed therein;
   a first locking member within said receptacle, said first locking member having a shaped aperture therein sized to receive said shaped end portion of said stud to drivingly connect said first locking member and said stud, said stud being separable from said first locking member;
   a second locking member mounted within said receptacle for generally axial movement relative to said nut portion;
   means for locking said second locking member against counterrotation, said second locking member being engageable with said first locking member to form a locking connection between said stud and said second locking member to allow said second locking member to positively lock said stud against said counterrotation;
   biasing means in said receptacle for urging said second locking member into locking engagement with said first locking member; and
   means for driving said second locking member generally axially relative to said first locking member against the force of the biasing means to break said locking connection to allow counterrotation of said stud relative to said nut portion to allow unscrewing of the threaded portion of said stud from the nut portion, said driving means having a first position within said bore when said stud is engaged with said receptacle and a second position when said stud is disengaged from said receptacle, the difference between said first and second positions of said driving means being such that an observer can ascertain from viewing the head portion of said stud, whether the stud is engaged with said receptacle.

2. The fastener of claim 1 wherein said driving means is positioned within said bore formed in said stud, said driving means having a first end portion positioned adjacent said stud head and a second end portion, opposite said first end portion, and facing towards said biasing means, said second end portion being in contact with one surface of said first locking member when said stud is engaged with said receptacle.

3. The fastener of claim 1 wherein said driving means comprises a member with a central bore and a longitudinal slot communicating with said bore.

4. The fastener of claim 3 wherein a U-shaped wire spring member having two legs, one leg extending outwardly and then inwardly forming a curved, protruding bearing surface thereon, is housed in said central bore, the bearing surface extending through said slot beyond the periphery of said stud body.

5. The fastener of claim 4 wherein the bearing surface of said spring member is biased outwardly but deflectable inwardly through said slot.

6. The fastener of claim 5 wherein said stud is slidable within said apertures in said panels and having a retracted position when pulled outwardly to a predetermined position, the bearing surface of said spring member being arranged to come in contact with the wall of said panel aperture when said fastener is in its retracted position, the stud being held outwardly by the contact of said bearing surface with said aperture wall.

7. The fastener of claim 6 wherein the opposite leg of said spring member bears against the opposite bore wall of said driving means, the protruding leg of said spring member being in contact with the wall surface of an aperture formed in said stud, the spring member supporting the driving means within said bore.

8. In a fastener for securing together a pair of panels wherein each of the panels has an aperture therethrough, the combination of:
   a receptacle connected to one of the panels and having an internally threaded nut portion;
   a stud extendible through the apertures of the panels and having an externally threaded portion and a head portion, said stud being rotatable relative to said nut portion to turn the threaded portion into said nut portion to secure said stud to said nut portion, said stud becoming disconnected from said nut in response to relative counterrotation between said stud and said nut, said stud having a shaped end portion and a bore formed therein;
   a first locking member within said receptacle, said first locking member having a shaped aperture therein sized to receive said shaped end portion of said stud to drivingly connect said first locking member and said stud, said stud being separable from said first locking member;

a second locking member mounted within said receptacle for generally axial movement relative to said nut portion;

means for locking said second locking member against counterrotation, said second locking member being engageable with said first locking member to form a locking connection between said stud and said second locking member to allow said second locking member to positively lock said stud against said counterrotation;

biasing means in said receptacle for urging said second locking member into locking engagement with said first locking member; and means for driving said second locking member generally axially relative to said first locking member against the force of the biasing means to break said locking connection to allow counterrotation of said stud relative to said nut portion to allow unscrewing of the threaded portion of said stud from the nut portion, said driving means having a first position within said bore when said stud is engaged with said receptacle and a second position when said stud is disengaged from said receptacle, said driving means comprising a cylindrically shaped member with a central bore and a longitudinal slot communicating with said bore.

9. The fastener of claim 8 wherein a U-shaped wire spring member having two legs, one leg extending outwardly and then inwardly forming a curved, protruding bearing surface thereon, is housed in said central bore, the bearing surface extending through said slot beyond the periphery of said stud body.

10. The fastener of claim 9 wherein the bearing surface of said spring member is biased outwardly but deflectable inwardly through said slot.

11. The fastener of claim 11 wherein said stud is slidable within said apertures in said panels and having a retracted position when pulled outwardly to a predetermined position, the bearing surface of said spring member being arranged to come in contact with the wall of said panel aperture when said fastener is in its retracted position, the stud being held outwardly by the contact of said bearing surface with said aperture wall.

12. The fastener of claim 11 wherein the opposite leg of said spring member bears against the opposite bore wall of said driving means, the protruding leg of said spring member being in contact with the wall surface of an aperture formed in said stud, the spring member supporting the driving means within said bore.

* * * * *